United States Patent [19]

Capurka

[11] 4,276,860

[45] Jul. 7, 1981

[54] APPARATUS FOR THE GENERATION OF MONOSTABLE PULSES HAVING PREDETERMINED DURATIONS INDEPENDENT OF INPUT SIGNAL PERIOD

[75] Inventor: Zbynek A. Capurka, Palatine, Ill.

[73] Assignee: Motorola, Inc., Schaumburg, Ill.

[21] Appl. No.: 90,209

[22] Filed: Nov. 1, 1979

[51] Int. Cl.³ .............................................. F02P 5/04
[52] U.S. Cl. ..................................... 123/415; 307/228; 123/609; 123/418
[58] Field of Search ............... 123/415, 418, 609, 610, 123/611; 307/228, 269, 355, 356

[56] References Cited

U.S. PATENT DOCUMENTS

| | | | |
|---|---|---|---|
| 3,011,072 | 11/1961 | Gerlach | 307/269 |
| 3,474,263 | 10/1969 | Kalb | 307/289 |
| 3,892,219 | 7/1975 | Preiser | 123/415 |
| 3,923,029 | 12/1975 | Polo | 123/415 |
| 3,943,896 | 3/1976 | Green | 123/415 |
| 4,041,912 | 8/1977 | Sessions | 123/415 |
| 4,043,302 | 8/1977 | Sessions | 123/415 |
| 4,057,740 | 11/1977 | Arguello | 123/415 |
| 4,102,310 | 7/1978 | Caron | 123/415 |
| 4,104,997 | 8/1978 | Padgitt | 123/418 |
| 4,106,440 | 8/1978 | Lai | 123/415 |
| 4,170,209 | 10/1979 | Petrie | 123/415 |

*Primary Examiner*—Ronald B. Cox
*Attorney, Agent, or Firm*—Joseph T. Downey; James W. Gillman

[57] ABSTRACT

Electronic signal processing circuitry particularly useful in the ignition system of an internal combustion engine is disclosed. A pulse generator includes a crankshaft position sensor supplying periodic position pulses to a bi-stable flip-flop circuit controlling a dual slope integration circuit. The integration circuit establishes a dual ramp time varying voltage signal at one input to a comparator for comparison with a reference voltage source which is established at the second input. At equality, an output pulse is initiated at the output of the comparator and this pulse is also used to change the logic state of the flip-flop. A hysteresis circuit responds to the initiation of the output pulse by modifying by a predetermined amount, the reference voltage level at the comparator. The duration of the output pulse is thereby made selectable and independent of variations in the period of the sensor pulses.

10 Claims, 13 Drawing Figures

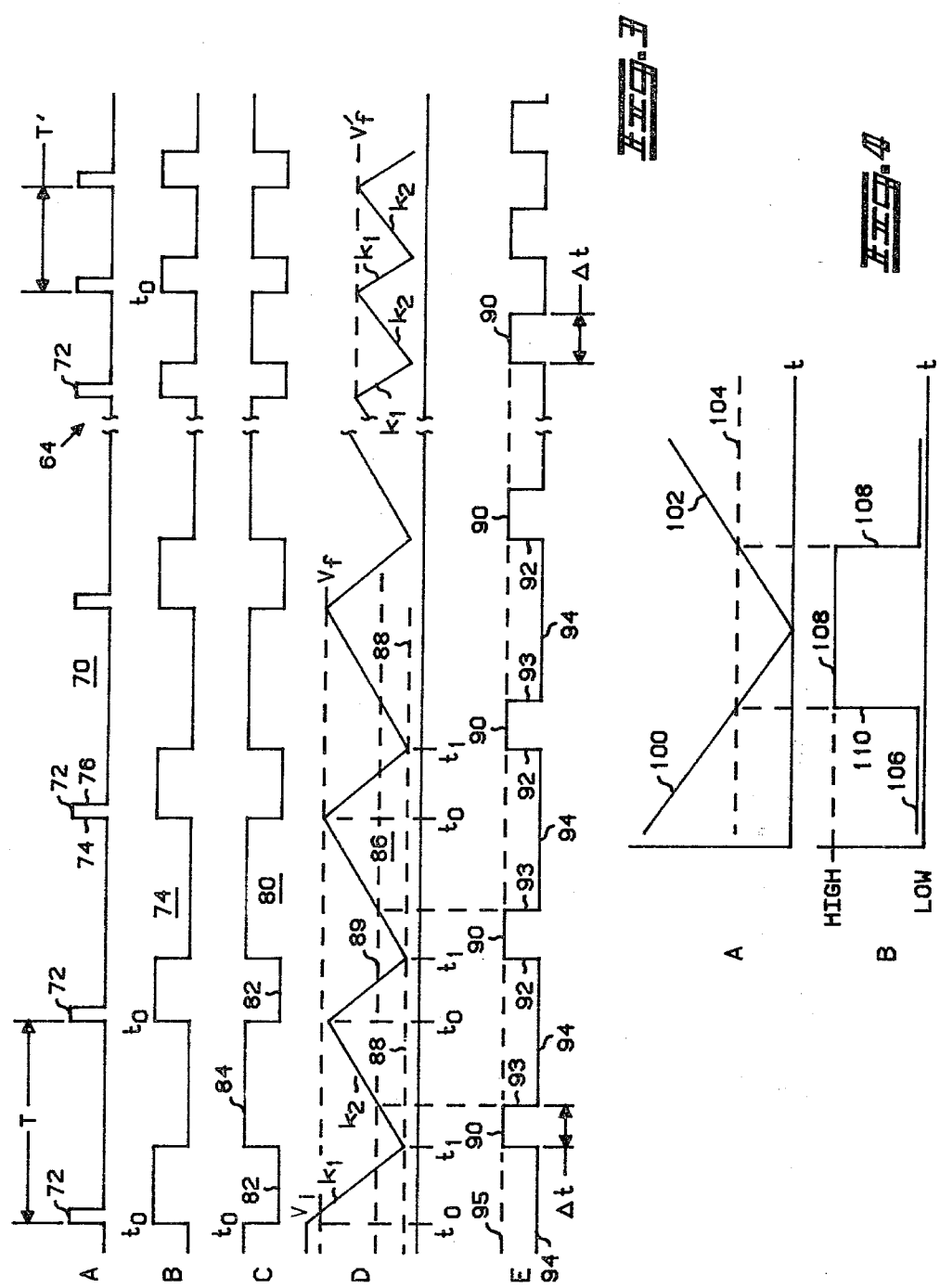

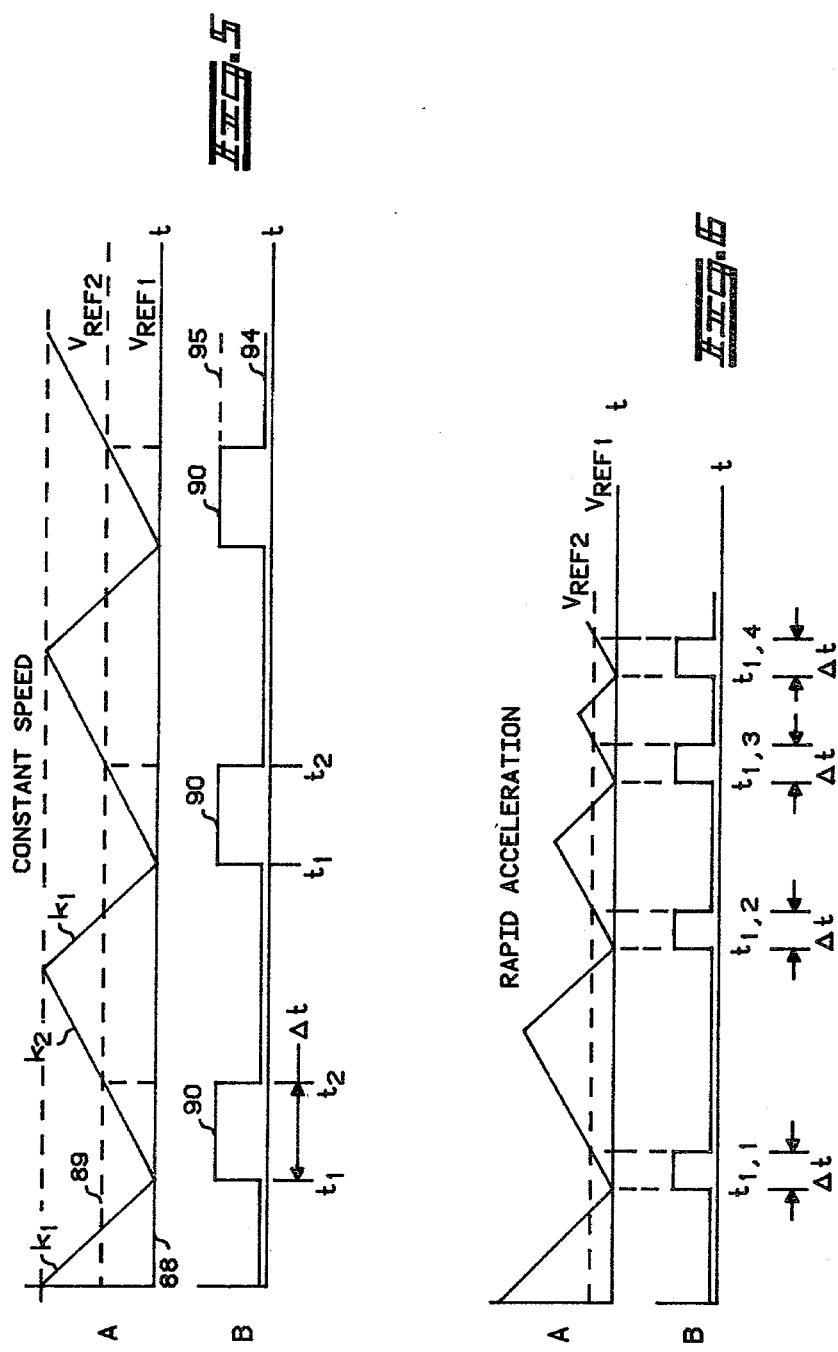

APPARATUS FOR THE GENERATION OF MONOSTABLE PULSES HAVING PREDETERMINED DURATIONS INDEPENDENT OF INPUT SIGNAL PERIOD

BACKGROUND OF THE INVENTION

1. Field of the Invention

The present invention generally relates to the field of electrical signal processing circuitry, and more particularly to the use of such circuitry for controlling internal combustion engine parameters such as the spark advance in an ignition system.

2. Description of the Prior Art

It has been recognized that the present day mechanical ignition systems for automobiles and similar vehicles cannot meet the requirement for reliably controlling the spark timing, dwell and the proper spark advance of an internal combustion engine over the estimated lifetime of the engine. Generally, most prior art electronic ignition systems utilize a crankshaft position sensor for synchronizing developed electronic control signals to predetermined positions of the engine crankshaft. However, the accuracy of prior art electronic ignition systems is critically dependent upon the duty cycle of the crankshaft position sensor signal. Since the duty cycle of the sensor signal (the ratio of one logic state produced by the sensor to the period of the sensor signal) may vary substantially for various configurations of sensors and under certain extreme engine conditions, most prior art electronic ignition systems have been unable to utilize the sensor signal to accurately control the dwell and spark timing of the engine with the precision which is desired.

One system describes a constant duty cycle monostable multivibrator circuit to produce a simulation of the pulses generated by a conventional point contact ignition system. The time during which the contact points would be held open is made equivalent to the time period of the output pulse generated by the circuit in its unstable state. The ratio of the times for the stable and unstable states or duty cycle of the monostable is a constant although the magnitude of each time individually varies inversely with engine speed.

U.S. Pat. No. 4,170,209, issued Oct. 9, 1979, to Petrie et al. titled "Ignition Dwell Circuit for an Internal Combustion Engine" and assigned to the assignee of the present application shows a circuit especially useful for producing output pulses which occur a fixed time before a predetermined rotational position of an engine's crankshaft. The circuit includes a position sensor triggered dual slope integration circuit producing signals which provides an accurate division of the rotational motion. A clamping circuit generates a corresponding signal having a peak magnitude which corresponds to a first predetermined reference level. A comparator produces a pulse when the clamping signal corresponds to a second reference level which occurs at the fixed time before the rotational position is reached.

SUMMARY OF THE INVENTION

Accordingly, it is an object of the present invention to provide an improved signal processing circuit producing a monostable timing signal adaptable for use with an internal combustion engine.

It is a further object of the present invention to provide an apparatus employing a hysteresis circuit for generating periodic pulse of selectable duration which is independent of the signal period of an input signal derived from a crankshaft position sensor.

In one embodiment of the present invention an improved apparatus for producing monostable type periodic pulses having selectable durations is provided. The apparatus comprises: input sensor means for producing periodic input pulses having leading and trailing edges, wherein the period of said input pulses is variable; bi-stable flip-flop means having set, reset and output terminals, said set terminal coupled to said input sensor means, said flip-flop means producing a first logic state signal at said output terminal in response to each input pulse, said flip-flop capable of producing a second logic state at said output terminal in response to pulses applied to said reset terminal; dual slope rate change means coupled to said bi-stable output terminal for producing a time varying signal having a magnitude varying at a first predetermined slope and direction in response to said first logic state signals and varying at a second predetermined slope with an opposite direction in response to said second logic state signals, said second rate being slower than said first rate; comparator means for comparing the magnitude of said varying signal, while said signal is varying at said first rate, to a predetermined reference level and initiates an output pulse when the magnitude equals said reference levels; hysteresis means coupled between the output of said comparator and said predetermined reference level; and means for coupling said output pulse to said reset terminal, said bi-stable means producing said second logic signal at said output terminal in response to the onset of said output pulse until a subsequent input pulse is received at said set terminal, whereby the duration of said output pulse is controlled by said hysteresis means and is independent of the period of said input pulses.

Essentially, a crankshaft position sensor produces input signal pulses where the period of these pulses is variable and inversely proportional to the speed of engine crankshaft rotation. A flip-flop circuit receives these input pulses at its set terminal and the logic states at its output terminal control a dual slope capacitive integrating circuit such that by charging a capacitor at a first slope and direction in response to one of the flip-flop output logic signals and at a second slope and opposite direction in response to another of the flip-flop output signals, a dual ramp (saw-toothed) waveform is produced. The waveform is coupled to a comparator means that compares the magnitude of the waveform to a reference level and produces an edge of output pulse when the magnitude of the waveform equals the reference level. The comparator means are coupled to the reset terminal of the flip-flop. A hysteresis circuit also connects the output of the comparator back to the reference level whereby the duration of the output pulse is selectable by adjustment of the values of the components in the hysteresis circuit and is independent of the variable period of the input signal pulses. By maintaining the first and second slopes and directions constant, a precise angular division of the input signal period is performed and the selectable duration output pulse produced can be used to control such engine parameters as the spark timing advance in an electronic ignition system.

BRIEF DESCRIPTION OF THE DRAWINGS

For a more complete understanding of the invention reference should be made to the drawings, in which:

FIGS. 3A-E are graphs illustrating the relative timing sequence and amplitudes of various signals produced by the circuit shown in FIG. 2.

FIGS. 4A, B are graphs illustrating the timing sequence for the operation of a voltage comparator without hysteresis.

FIGS. 5A, B are graphs of a portion of FIG. 3 enlarged for additional clarity.

FIGS. 6A, B are graphs illustrating the timing sequences shown in FIG. 5 under the condition of very rapid engine acceleration.

DESCRIPTION OF THE PREFERRED EMBODIMENT

Figure 1:
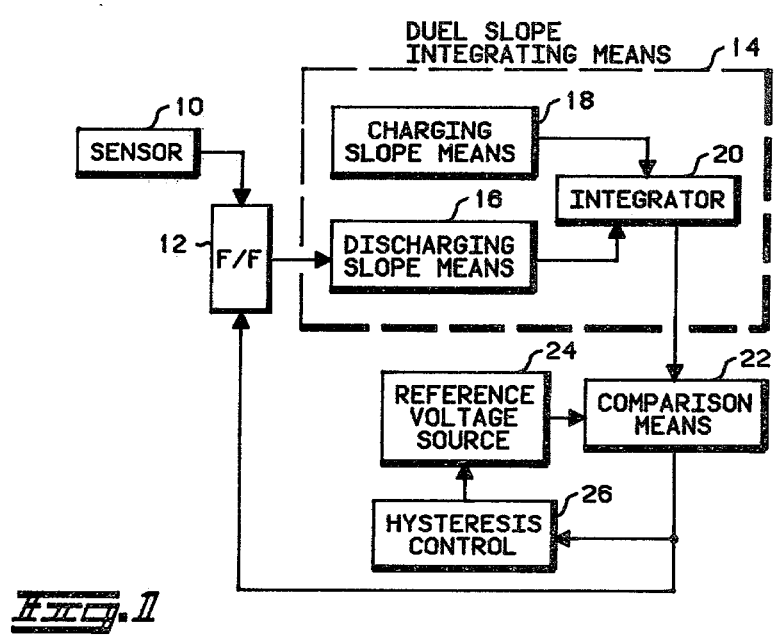
FIG. 1 is a functional block diagram of an apparatus adaptable for use in an ignition system in which periodic output pulses are produced having selectable durations and which are independent of the period of an input signal.

Referring now to FIG. 1, an apparatus for the generation of monostable pulses having durations which are independent of the input signal period is shown. A periodic input signal from sensor 10 is coupled to an input of a flip-flop circuit 12 which has an output coupled to a dual slope integrating means 14. The dual slope integrating means (shown enclosed in a broken line) is further comprised of a discharging slope means 16, which receives an output signal from flip-flop 12 and charging slope means 18. Both signal means are connected to an integrator 20 whose output is coupled to a first input of a comparison means 22. Comparison means 22 also receives at a second input, a voltage signal from reference voltage source 24. The output signal from comparison means 22 is coupled to hysteresis control circuit 26 and to flip-flop 12. Hysteresis control circuit 26 is connected to reference signal source 24 and operates to change the reference voltage input to comparison means 22 at a predetermined time. The output of comparison means 22 is a monostable pulse having a duration which is independent of the period of the input sensor signal.

The hysteresis control circuit operates to change the voltage at the reference input of comparison means 22 immediately after the comparison means 22 has changed its state in response to the initial condition of voltage equality. Hysteresis in this sense means a form of non-linearity in the response of the circuit to a particular set of input conditions which depend not only on the instantaneous values of those conditions, but also on the immediate past of the input and output signals. It is the interconnection of the hysteresis circuit with the comparison means 22 which establishes at the output of comparison means 22 the fixed duration monostable pulses. As will be more particularly described later, a fixed width time pulse can be generated at a period corresponding to the engine rotation period detected by sensor 10. Modifications in the hysteresis control circuit can alter the pulse width of the monostable output pulses. Thus, within certain design limitations which relate to the design criteria of the engine and the speed range over which it operates, a selectable range of pulse widths may be established to control engine parameters. In particular the pulses may be used to advance or retard the spark timing by a fixed amount. It will be understood by those skilled in the art that additional spark timing modification may be achieved in an incremental manner.

Figure 2:
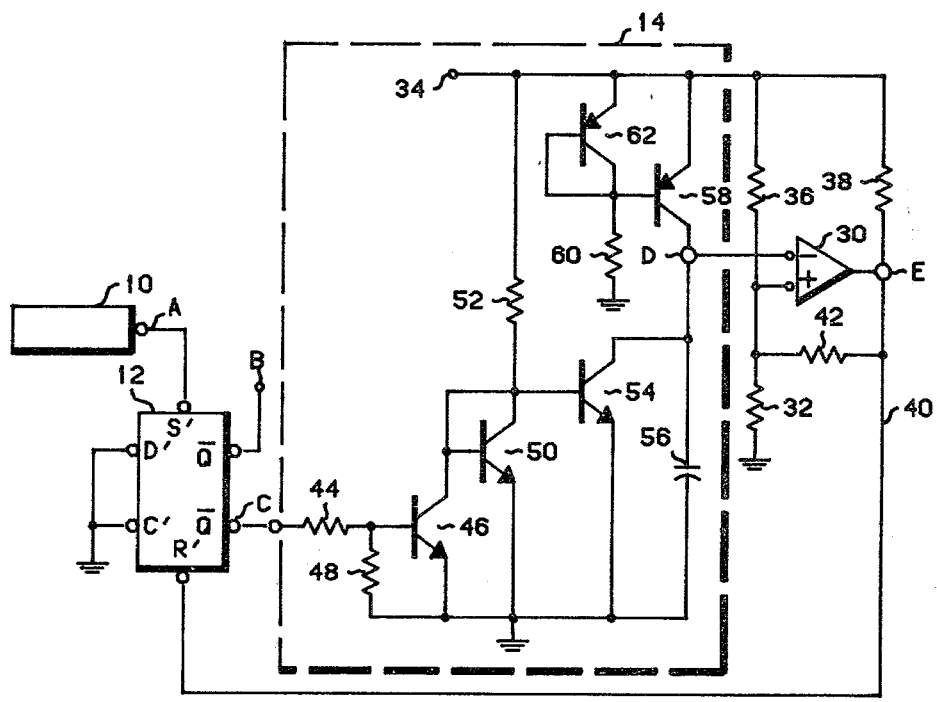
FIG. 2 is a schematic diagram of the electronic circuit diagrammed in FIG. 1.

FIG. 2 is a schematic for the circuit block diagrammed in FIG. 1 and illustrates the apparatus which receives periodic input signals producing periodic monostable output pulses that have durations independent of the input signal period. The apparatus basically comprises an input sensor 10, a D-type flip-flop circuit 12 connected as an R-S flip-flop, a dual slope integrating circuit 14 again shown enclosed with a broken line and a voltage comparator 30.

Preferably, the apparatus is intended for use in the ignition system of an internal combustion engine and the sensor 11 corresponds to a crankshaft position sensor for producing periodic input pulses having leading and trailing edges at an output terminal A. The period of these input pulses is variable and related (inversely proportional) to the rotational speed of the crankshaft of the engine since the occurrence of these pulses is determined by predetermined rotational positions of the engine crankshaft (not shown). The sensor 10 can be either a magnetic sensor or, preferably, a Hall effect sensor.

The terminal A of the sensor 10 is directly coupled to a set terminal S' of the flip-flop 12. Data and clock terminals (D' and C', respectively) of the flip-flop are both directly connected to ground potential and a flip-flop output terminal $\overline{Q}$ is directly connected to an output terminal B while an additional flip-flop output terminal Q is directly connected to a terminal C, which is the input terminal of the dual slope integrating circuit 14. A terminal D is the output terminal of the dual slope circuit 14 and is directly connected as an input to an inverting input terminal of a comparator 30. A non-inverting input terminal of the comparator 14 is connected to ground through a resistor 32 and is also connected to a positive voltage supply terminal 34 through a resistor 36. A terminal E represents the output terminal of the comparator 30 and is coupled to the positive voltage supply terminal 34 through a resistor 38. Terminal E is directly connected by a conductor 40 to a reset terminal R' of the flip-flop 12.

The output terminal of comparator 30 is also connected to its own non-inverting input terminal through a resistor 42. It is this circuit interconnection which provides the hysteresis effect and determines the fixed pulse width for output pulses from comparator 30. It may be appreciated that the value of resistor 42 in the hysteresis circuit can be changed in conjunction with the reference voltage source to produce a different pulse width.

The dual slope integrating circuit 14 shown in FIG. 2 comprises a resistor 44 coupled between the terminal C and the base of an NPN transistor 46 which is also connected to ground through a resistor 48. The emitter of the transistor 46 is connected to ground and the collector is directly connected to both the base and collector electrodes of an NPN transistor 50 which has its emitter directly connected to ground. The collector of transistor 50 is connected to the voltage supply terminal 34 through a resistor 52 and is directly connected to the base of an NPN transistor 54. Transistor 54 has its emitter directly connected to ground and its collector directly to the output terminal D. An integrating capacitor 56 is coupled between the terminal D and ground. A PNP transistor 58 has its collector electrode directly connected to the terminal D and its emitter electrode connected to the terminal 34. The base of the transistor 58 is connected to ground through a resistor 60 and is directly connected to the base and collector electrodes of a PNP transistor 62, which has its emitter directly connected to the terminal 34. The components 44–62 comprise the dual slope integrating circuit 14 shown in FIG. 2.

The operation of the circuit shown in FIG. 2 will now be described with reference to the signal waveforms illustrated in FIGS. 3A through 3E which directly correspond to the signal waveforms produced at the terminals A–E in FIG. 2, respectively. The waveforms in FIGS. 3A–E represent voltage waveforms for which the vertical axis represents amplitude and the horizontal axis represents time. A breakpoint 64 is shown in the time axis of these waveforms and the waveforms to the right of the breakpoint represent those signals produced at an engine crankshaft speed which is approximately twice the engine crankshaft speed that produced the waveforms to the left of the breakpoint. In all of the drawings, identical reference numbers and letters are used to identify identical components, terminals, signals and reference voltage levels.

As previously mentioned, the crankshaft position sensor 10 produces a sensor signal designated generally by the reference number 70 and shown in FIG. 3A. This signal 70 comprises a plurality of variable period input signal pulses 72 wherein each pulse occurs at a predetermined rotational position of the engine crankshaft. Each pulse has a leading edge 74 and a trailing edge 76. FIG. 3A illustrates that the pulses produced to the left of the breakpoint 64 occur at a period T. This period is variable and is inversely proportional to the rotational speed of the engine crankshaft. To the right of the breakpoint 64, the signal 70 is illustrated as having a period T' which represents a higher engine crankshaft rotational speed, approximately twice the rotational speed that created the signal 70 to the left of the breakpoint 64. While FIGS. 3A–E illustrate signals with constant periods to the right and left of the breakpoint 64, it should be noted that the input signal period is related to the engine crankshaft speed and therefore is contemplated as being variable. FIGS. 3A–E are merely shown with two different constant periods to clarify the explanation of the operation of the present invention.

In FIG. 3A each sensor pulse 72 is illustrated as occurring at a time $t_o$, and the time from one $t_o$ to the next represents the period T of the signal 70. The pulses 72 are received at the set terminal S' of the bi-stable flip-flop circuit 12. FIGS. 3B and 3C illustrate the outputs of the flip-flop circuit 12 at the output terminals Q and $\overline{Q}$, repsectively, as well as the signals created at the terminals B and C, respectively. The signal produced at terminal B is designated by the reference number 78 whereas the signal produced at the terminal C is designated by the reference numberal 80. Each signal comprises first and second logic states and the logic states of signal 78 are the inverse of the logic states of signal 80.

In response to each sensor pulse 72 received at the set terminal S', the flip-flop circuit 12 creates a low logic signal 82 at the terminal C. Subsequently for the preferred embodiment, after precisely one-third of the period T has elapsed, the signal 82 will be switched to a second or high logic state 84 and the signal 80 will retain this second logic state until the next input sensor pulse 72. The manner by which the signal 80 is caused to switch logic states after the elapsing of precisely one-third of the period T will now be discussed.

FIG. 3D illustrates a dual ramp signal 86 representing the voltage at the terminal D which is the voltage maintained at one terminal of the capacitor 56. Initially, at the time $t_o$ the voltage 86 is assumed to be at an initial value $V_i$. In response to the low logic state 82 produced at the terminal C, with the low logic state corresponding to ground potential, the transistor 46 is turned off. This results in turning on the transistor 50 and having the transistor 54 discharge the capacitor 56 at a constant predetermined rate. This constant discharging rate is illustrated in FIG. 3D by the straight line segment having negative slope $k_1$ and this rate of discharge is determined by the current passing through the resistor 52, minus any charging current supplied by the transistor 58. The transistor 50 is essentially connected as a diode and the current through the resistor 52 determines the voltage developed by the diode connected transistor 50. Since transistor 54 has its base-emitter junction biased by the voltage developed by the diode connected transistor 50, the transistor 54 will also conduct precisely the same current that is being drawn through the resistor 52. Thus the combination of the components 50 through 54 represents a constant current source that results in discharging the capacitor 56 at a predetermined rate $k_1$ which results in decreasing the voltage across the capacitor, corresponding to the signal 86, at the same rate.

The voltage at the terminal D is monitored by the comparator 30 which compares this voltage to a predetermined reference level voltage initially determined by the resistor divider network comprising the resistors 32 and 36 since the output of comparator 30 is at a low logic level. This first reference level voltage corresponds to the voltage at the junction between the resistors 32 and 36 and is illustrated in FIG. 3D by the broken reference line 88.

The output of the comparator 30 at the terminal E remains constant at a low level until the capacitor voltage signal 86 at the terminal D is decreased enough so that its magnitude equals the initial reference level voltage 88. When this occurs, the comparator 30 produces a pulse signal 90 as shown in FIG. 3E. As shown, the equality condition occurs at a time $t_1$ after the time $t_o$. The duration of this pulse 90 is controlled by the presence of the hysteresis circuit and will be explained in greater detail later. It may be observed in FIG. 3D that when signal 86 reaches a second voltage reference level 89 the pulse 90 is terminated. The pulse 90 is supplied to the reset terminal R' of the flip-flop 12 by a conductor 40. The leading edge 92 of the pulse 90 causes switching of the logic state of the signal 80 at the terminal C to the second logic state 84.

With signal 80 having a magnitude corresponding to the second logic state or high voltage logic state 84, transistor 46 is turned on. When transistor 46 is turned on, the transistors 50 and 54 are turned off thereby preventing the discharge of the capacitor 56 by means of the current drawn by the transistor 54.

Whenever the transistor 54 is not discharging the capacitor 56, the transistors 58 and 62 will charge up the capacitor at a constant predetermined rate $k_2$ (smaller magnitude than the rate $k_1$) determined by the magnitude of the resistor 60. The components 58–62 represents a constant current source which functions identically to the constant current source created by the components 50–54. The signal 86, corresponding to the voltage at terminal D, is increased at a constant rate determined by the magnitude of the resistor 60. This constant rate of increase is illustrated in FIG. 3D by a straight line segment having a positive slope $k_2$, whereas the slope $k_1$ had a negative slope. The magnitude of the signal 88 continues to increase until a crankshaft position pulse 72 is again received at the set terminal S' of the flip-flop 12, which results in recommencing the entire previously described cycle.

As will be described more fully later, since the magnitude of the voltage at the terminal D is increasing at the rate $k_2$ at time $t_1$, this would normally result in terminating the pulse 90 produced by the comparator 30 resulting in a spike. But the presence of the hysteresis circuit prevents the termination under these conditions and pulse 90 is characterized by a leading edge 92, a trailing edge 93 and having a low logic level 94 and a high logic level 95. The hysteresis circuit functions to maintain the high logic level output for comparator 30 for a predetermined time after which the output returns to the low logic level 94. The pulse 90 termination is determined by equality between signal 86 and the second voltage reference level 89. This is shown in FIG. 3E which also shows that although T' on the right side of break line 64 is much less than T and the corresponding sensor and voltage signals are contracted on the right hand side of break line 64, the pulse width T for pulse 90 remains invariant.

For the magnitude of slope $k_1$, equal to 2 times the magnitude of slope $k_2$ which is the case for the preferred embodiment the time division of the input sensor signal is 1:2. An additional description of the circuit operation and a full discussion of the design parameters for the dual slope integrating circuit without a hysteresis circuit may be found in the above-mentioned U.S. Pat. No. 4,170,209 which is hereby incorporated by reference.

Although voltage comparators are well known in the art, it is advantageous to describe the operation so that the function of the comparator with the hysteresis circuit can be better understood. FIG. 4A illustrates the voltage levels at the inputs to a comparator, identical to comparator 30 but with the hysteresis circuit comprising resistor 42 removed, and FIG. 4B illustrates the corresponding logic levels at the comparator output. Ramp voltage signals 100 and 102 are serially applied to the inverting input terminal of the comparator. A reference voltage 104 is applied to the non-inverting input terminal of the comparator. FIG. 4B shows the output of the comparator as a square wave pulse having a low logic level 106 and a high logic level 108. The leading edge 110 of the square wave pulse occurs at a time when ramp voltage 100 is equal to the reference voltage 104. At this instant the comparator changes state producing leading edge 110. The voltage level at the negative input voltage to the comparator has now become less than the reference voltage 104 and as long as this condition exists the comparator is inhibited from further changes of state. At the same time subsequent to the change to a high logic state, ramp signal 102 increases the voltage level applied at the negative input of the comparator to again equal the reference voltage 104. At equality, the comparator changes state to the low logic level 106 and produces the trailing edge 112 of the square wave pulse. The state of the comparator output is seen to depend upon the relative magnitudes of the voltages at the input terminals and changes of state occur only at equality.

It is the interconnection of resistor 42 in combination with resistors 32, 36 and 38 which constitute the hysteresis circuit in the preferred embodiment. Comparator 30 compares two along voltages, one from capacitor 56 and the other a reference, and develops logic output signals distinguishing the variable input voltage as being greater or less than the reference level. The transition between the logic levels occurs at the instant of equality at the input terminals of comparator 30. As those skilled in the art will appreciate variation of the values of resistors 32, 36, 38 and 42 will produce a range of output pulse durations.

In operation, as the voltage 86 at terminal D of capacitor 56 decreases to an initial reference level 88, comparator 30 remains in a low logic level designated as 94 in FIG. 3E. For increased clarity FIGS. 5A, B show corresponding portions of FIGS. 3D and 3E on an enlarged scale. At time $t_1$ when the voltage at terminal D equals the initial reference voltage level 88 now designated as $V_{REF1}$ in FIG. 5A, the comparator 30 changes its logic state from 94 to 95 to produce the leading edge 92 of pulse 90. However, due to the hysteresis circuit, at substantially the same time $t_1$, the original reference voltage level $V_{REF1}$ has been changed to a voltage level 89 now designated as $V_{REF2}$. Since the voltage at terminal D is now less than the new reference level, comparator 30 maintains the high logic level 95 as shown in FIG. 5B. No change of state can occur in comparator 30 until the voltage at terminal D is increased to equal the value of the new reference level $V_{REF2}$. This occurs at time $t_2$ at which time the output of comparator 30 returns to its low logic level 94. And, at substantially the same time, the voltage reference level returns to $V_{REF1}$. It may be observed that the reference voltage level changes are always in the direction of anticipated changes in the voltage at terminal D to prevent any uncertainty caused by a multi-valued functional relationship in the voltage vs time plots. As before, the time interval $\Delta t = t_2 - t_1$ does not vary from pulse to pulse.

FIGS. 6A, B show graphs similar to FIGS. 5A, B but under the conditions of very rapid engine acceleration. As may be seen the intervals between pulses 90 is rapidly diminishing but the pulse width $\Delta t$ is again invariant. Thus, as may be seen in FIGS. 6A, B, a fixed duration time pulse has been derived which is independent of the period of the incoming sensor pulse signal.

As will be appreciated by those skilled in the art, one or more additional comparators may be coupled to capacitor 56 and to an independent reference voltage source for the purpose of initiating a pulse which has a leading edge at any time before or after the initiation of the pulse by comparator 30. A more likely choice is to initiate the new pulse before the equality in comparator 30. This additional pulse may be combined with the output pulse from comparator 30 in a logic circuit to generate a fixed duration time pulse beginning at any time within the period of the sensor signal. The combined pulse would again have a selectable duration and be invariant within the normal design limitations of the engine and its operational range.

While a specific embodiment of this invention has been shown and described, further modifications and improvements will occur to those skilled in the art. All modifications which retain the basic underlying principles disclosed and claimed herein are within the scope of this invention.

I claim:
1. An apparatus for generating selectable duration periodic pulses comprising:
   sensor means producing periodic sensor signals having a variable period;

bi-stable flip-flop means, coupled to said input sensor means, said flip-flop means capable of producing a first and second logic state signals and producing said first logic state signal in response to each periodic sensor signal;

dual slope rate means, coupled to said bi-stable flip-flop means, producing a time varying signal at a first predetermined rate in one direction in response to said first logic state signal and at a second predetermined rate in the opposite direction in response to said second logic state signal;

reference source means providing a first predetermined reference voltage level;

comparator means, coupled to said dual slope rate means and said reference source means, comparing the magnitude of said time varying signal to said first predetermined reference voltage level and producing an output pulse when the magnitude of said time varying signal equals said first reference voltage level;

means for coupling said output pulse to said bi-stable means, said bi-stable means producing said second logic state signal in response to the initiation of said output pulse and maintaining said second logic state signal until a subsequent sensor signal is received, whereby said first and second logic state signals have durations equal to a predetermined percentages of the variable period of said periodic sensor signals; and hysteresis means, responsive to said comparator means and coupled to said reference source means, for adjusting the magnitude of the reference voltage level to a second predetermined voltage level, whereby the duration of the output pulses produced by said comparator is selectable and independent of the period of the sensor signal.

2. The apparatus of claim 1 wherein said dual slope rate means further includes a capacitor coupled to opposite polarity constant current sources and wherein said time varying signal is created by the charging and discharging of said capacitor.

3. The apparatus of claim 2 wherein said comparator means further includes a pair of input terminals and an ouput terminal at which said periodic output pulses are established and wherein said reference source means and said hysteresis means are mutually connected to one of said input terminals.

4. The apparatus of claim 3 wherein said hysteresis means further comprises resistance means coupled between the output terminal of said comparator means and said one input terminal of said comparator means.

5. The apparatus of claim 4 wherein the magnitudes of said resistance means and said reference source means control the duration of said output pulse established at the output terminal of said comparator.

6. The apparatus of claim 5 wherein said sensor means corresponds to a position sensor producing said sensor signals at predetermined rotational positions of the crankshaft of an engine.

7. The apparatus of claim 6 wherein said first logic state signal exists for approximately one-third of the periodic sensor signal period and said second logic state signal exists for approximately two-thirds of the periodic sensor signal period, and wherein said first rate has a magnitude approximately twice that of said second rate.

8. An ignition system pulse generator for producing periodic pulses of selectable duration especially adaptable for controlling the spark timing advance of an internal combustion engine, comprising:

sensor means for producing periodic sensor pulses, the period of said pulses being variable and proportional to the speed of an internal combustion engine;

bi-stable flip-flop circuit having two input terminals and one output terminal, said sensor means being coupled to a first of said input terminals, said flip-flop circuit producing a first logic state signal at said output terminal in response to each sensor pulse applied said flip-flop circuit being capable of producing a second logic state signal at said output terminal in response to a signal applied to the second of said input terminals;

dual slope rate change means responsive to said logic state signal at said flip-flop circuit output terminal and producing a time varying signal, varying at a first predetermined rate and direction in response to said first logic state signals and at a second predetermined rate in an opposite direction in response to said second logic state signal, said second rate being smaller in magnitude than said first rate;

reference source means providing a predetermined reference voltage level;

comparator means comparing the magnitude of said time varying signal to a predetermined reference level and initiating an output pulse when the magnitude of said signal equals said predetermined reference level;

means for coupling said output pulse to the second of said input terminals of said flip-flop circuit, said flip-flop circuit producing said second logic signal at said output terminal in response to the reception of said output pulse and maintaining said second logic signal until a subsequent input sensor pulse is received, whereby the logic state signals of said flip-flop circuit have durations equal to predetermined percentages of the engine speed variable period as sensed by said sensor signal; and hysteresis means, responsive to the initiation of said output pulse, for adjusting the magnitude of the voltage level of said predetermined voltage level applied to said comparator, whereby the duration of the output pulses is selectable and independent of the period of said sensor signals.

9. The ignition system pulse generator of claim 8 wherein said comparator means further includes a pair of input terminals and wherein said reference source means and said hysteresis means are mutually connected to one of said input terminals and said time varying signal is coupled to the other of said input terminals.

10. The ignition system pulse generator of claim 8 wherein said hysteresis means further comprises resistance means coupled between the output terminal of said comparator means and said one input terminal of said comparator means.

* * * * *